Aug. 6, 1940. E. NEWNHAM Re. 21,525

FLEXIBLE BLADE FAN

Original Filed Feb. 18, 1936

Witness
H. S. Manzenmair

Inventor
Eugene Newnham
By Bair, Freeman & Sinclair
Attorneys

Reissued Aug. 6, 1940

Re. 21,525

UNITED STATES PATENT OFFICE 21,525

FLEXIBLE BLADE FAN

Eugene Newnham, St. Louis, Mo., assignor to Knapp-Monarch Company, St. Louis, Mo., a corporation of Missouri Original No. 2,067,410, dated January 12, 1937, Serial No. 64,513, February 18, 1936. Application for reissue January 10, 1939, Serial No. 250,247

19 Claims. (Cl. 170—173)

An object of my invention is to provide a flexible blade fan in which simple and inexpensive construction is provided for mounting flexible fan blades relative to a motor shaft or the like.

Still a further object is to provide a fan structure in which a cap is provided with slots through which fan blades extend, the inner ends of the fan blades being secured together as by a collar or the like to position the blades radially with respect to the cap.

A still further object is to provide a hub structure especially designed for mounting flexible blades of rubber or similar material, so that they are maintained at the proper pitch angle, although upon striking an object they can bend backwardly for the purpose of preventing breakage of the blades and/or damage to the object.

More particularly it is an object of my invention to provide a cap moulded or otherwise fixed relative to a hub and provided with slots at the proper pitch angle through which the fan blades may extend, the inner ends of the blades being secured together to retain them in position relative to the cap against the action of centrifugal force when the cap is rotated.

Still another object is to provide a structure which includes a combination of elements including a hub, fan blades, a connector element, and a cap, the blades being readily insertible simultaneously into slots of the cap during assembly by rotating the blades relative to the cap and thereafter held by the slots at the proper pitch angle and by the connector element against expulsion by centrifugal action when the structure is rotated.

With these and other objects in view, my invention consists in the construction, arrangement and combination of the various parts of the device, whereby the objects contemplated are attained, as hereinafter more fully set forth, pointed out in my claims, and illustrated in the accompanying drawing, in which:

Figure 1:
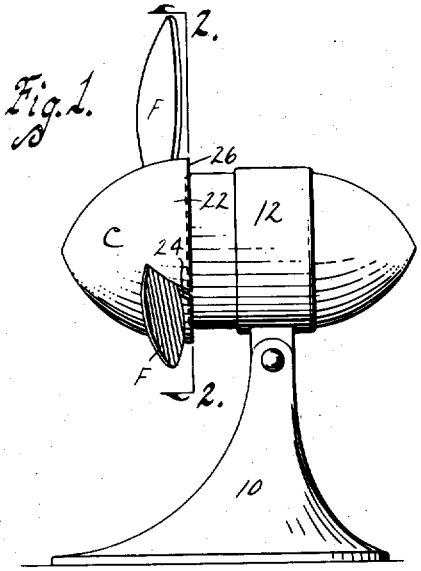
Figure 1 is a side elevation of a flexible blade fan embodying my invention.

On the accompanying drawing I have used the reference numeral 10 to indicate a support in the form of a base for a fan motor 12. The shaft of the fan motor is indicated at 14. My improved fan structure comprises a hub H, a cap C and fan blades F.

The hub H is bored as indicated at 13 to receive the shaft 14, and is permanently mounted on the shaft by a set screw 16. For affording access of a screw driver to the set screw 16, I provide a notch 18 in the cap C.

The cap C is moulded on one end of the hub H and has a central boss 20 engaging the hub H. The hub H may be knurled or otherwise roughened to afford a good joint between the hub H and the boss 20.

The cap C extends from the boss 20 back over the hub H and is provided with an annular portion 22, which completely surrounds the hub and conceals it. The annular portion 22 is provided with a plurality of slots 24 cut inwardly from the back face or base 26 of the cap C. These slots are arranged at the desired pitch angle for the blades F, so as to maintain the blades normally at their pitch angle.

The blades F are of a material sufficiently rigid to normally maintain their pitch angle, yet flexible enough to bend upon striking an object, so that the blades are not thereby broken and do not injure the object they strike, such as a person's hand. I have found rubber to be a suitable material. This eliminates the necessity of providing a shield on the fan.

Figure 2:
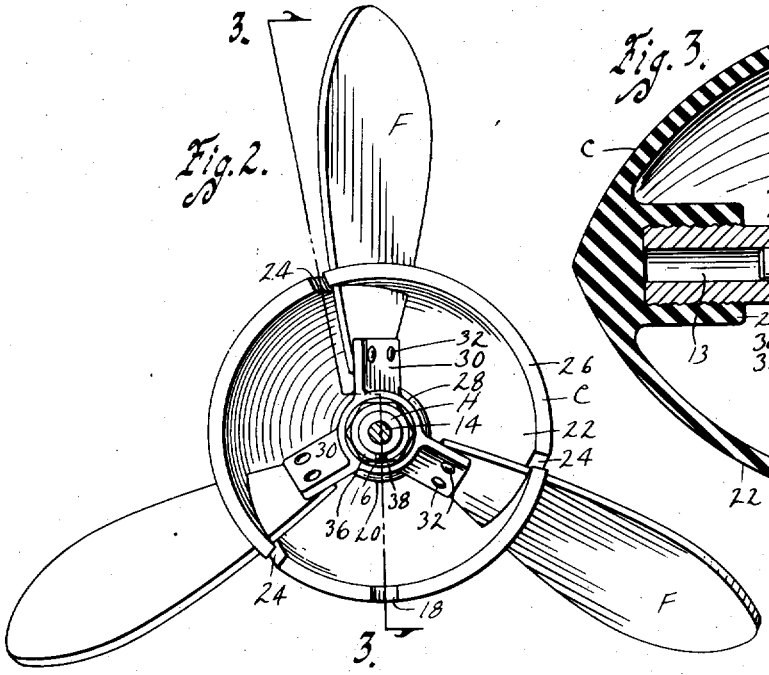
Figure 2 is an enlarged sectional view of the same on the line 2—2 of Figure 1.
Figure 3:
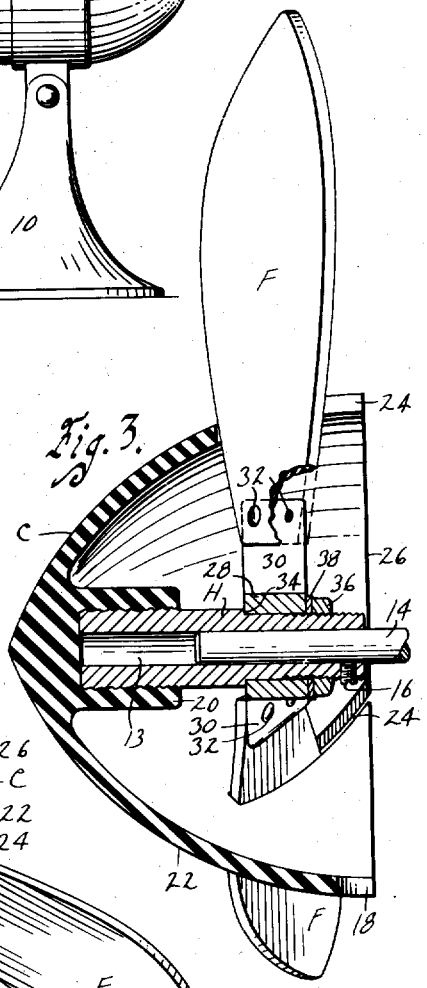
Figure 3 is a further enlarged sectional view on the line 3—3 of Figure 2.

The blades F are retained against outward movement, caused by centrifugal action, by a collar or connector element 28 having a plurality of counterpart and rotationally spaced arms 30. The arms 30 may also be arranged at the desired pitch angle, or substantially parallel to the slots 24, as is obvious in Figure 2. The arms 30 are connected as by rivets or the like 32 to the inner ends of the blades F. Thus the blades are retained against radial outward movement through the slots 24 upon rotation of the fan.

The hub H is provided with a shoulder 34. The collar 28 is seated against the shoulder and retained thereagainst by a lock nut 36. A washer 38 is interposed between the lock nut and the collar.

In the mounting of flexible blades relative to a hub, which of necessity must be rigid, problems are involved which are overcome in a simple manner by the construction I have devised. My construction is inexpensive and readily assembled. The cap C may be of any suitable material, although I prefer to use bakelite, hard rubber or the like. The present device provides a very ruggedly constructed fan, yet one which has the advantage of the flexible blades which require no guard to protect the user from injury upon coming in contact with the rapidly rotating blades of the fan.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. A flexible blade fan comprising a hub having arms arranged at the desired pitch angle, a plurality of single piece blades each formed of material sufficiently flexible upon striking an object to bend and of itself to re-assume its original position without permanent distortion, and sufficiently rigid that during rotation it will maintain its pitch for the purpose of air delivery, said blades having their inner ends secured to said arms and a cap connected with said hub, said cap having slots to receive said blades at points spaced outwardly from their secured inner ends, said slots being arranged at the desired pitch angle relative to the axis of rotation of the cap.

2. A flexible blade fan comprising a hub, a plurality of blades each formed of material sufficiently flexible upon striking an object to bend and of itself to re-assume its original position without permanent distortion, and sufficiently rigid that during rotation it will maintain its pitch for the purpose of air delivery, said blades having their inner ends secured at the desired pitch angle to said hub and a cap connected with said hub, said cap having slots to receive said blades at points spaced outwardly from their inner ends, said slots being arranged at the desired pitch angle relative to the axis of rotation of the cap, the slots of said cap opening at one face thereof whereby said blades may be inserted edgewise into the slots during assembly.

3. A flexible blade fan comprising a hub, a plurality of blades radiating therefrom and being formed of material sufficiently flexible to permit bending thereof upon engaging an object during rotation of the fan, yet sufficiently rigid to maintain its pitch angle during rotation for effective air delivery, a cap secured to and surrounding said hub and having slots inwardly from the base thereof arranged at an angle relative to the axis of the cap, said blades extending from said hub through said slots and thereby maintained beyond the cap at the desired pitch angle, said cap being ellipsoidal and ahead of said blades, converging substantially to a point.

4. A flexible blade fan comprising a hub, a plurality of blades radiating therefrom and being formed of material sufficiently flexible to permit bending thereof upon engaging an object during rotation of the fan, yet sufficiently rigid to maintain its pitch angle during rotation for effective air delivery, a hollow cap secured to and enclosing said hub and having slots inwardly from the base thereof arranged at an angle relative to the axis of the cap, a collar on said hub concealed within said cap, the inner ends of said blades being secured to said collar at the desired pitch angle and the outer ends thereof extending through said slots.

5. A fan structure comprising a hub having flat arms, a plurality of fan blades having their inner ends secured flatwise thereto and means spaced radially from said hub and fixed relative thereto for determining the pitch angle of said blades, said means having slots for receiving said blades edgewise, each slot being arranged at an angle relative to the axis of rotation of said hub.

6. In a device of the class described, a hub, substantially flat blades of sufficiently rigid material to normally maintain their pitch angle for the purpose of propelling air, yet sufficiently flexible to permit bending thereof upon coming in contact with an object, said blades having their inner ends secured to said hub and extending substantially radially from the hub and means also extending from the hub and engaging the blades throughout the width of each at a point radially outwardly from the hub to determine the pitch angle of the blades.

7. In a device of the class described, a hub, blades of sufficiently rigid material to normally maintain their pitch angle for the purpose of propelling air, yet sufficiently flexible to permit bending thereof upon coming in contact with an object, said blades having their inner ends secured to said hub and extending substantially radially from the hub and means also extending from the hub and engaging the blades radially outwardly from the hub to determine the pitch angle of the blades, said means comprising a cap having slots receiving said blades, said blades filling the slots widthwise.

8. In a device of the class described, a hub, blades of sufficiently rigid material to normally maintain their pitch angle for the purpose of propelling air, yet sufficiently flexible to permit bending thereof upon coming in contact with an object, said blades having their inner ends secured to said hub and extending substantially radially from the hub and means also extending from the hub and engaging the blades radially outwardly from the hub to determine the pitch angle of the blades, said means comprising a cap having its center portion mounted on one end of said hub and having an outwardly sloping annular portion provided with slots arranged at an angle relative to the axis of rotation of the cap and receiving said blades.

9. In a device of the class described, a hub, blades of sufficiently flexible material to bend upon striking an object, yet sufficiently rigid to normally maintain their pitch angle, a collar on said hub and having blade-like arms, the inner ends of said blades being secured to said blade-like arms and means extending from the hub and engaging the blades throughout the entire width of each to determine the pitch angle of the blades.

10. In a device of the class described, a hub, blades of sufficiently flexible material to bend upon striking an object, yet sufficiently rigid to normally maintain their pitch angle, a collar on said hub, the inner ends of said blades being secured thereto and means extending from the hub and engaging the blades radially outwardly from said collar to determine the pitch angle of the blades, said hub having a shoulder against which said collar abuts and a lock nut on said hub engaging the collar and retaining it in engagement with said shoulder.

11. A fan structure comprising a hub, a cap having a center portion mounted on one end of said hub and an annular portion surrounding and concealing the hub, said annular portion having slots to receive fan blades edgewise, fan blades received in said slots and means for attaching the inner ends of said fan blades to said hub.

12. A fan structure comprising a hub, a cap having a center portion, one end of said hub being embedded therein, said cap having an annular portion surrounding and concealing the hub, said annular portion having slots to receive fan blades edgewise, fan blades received in said slots and means within said annular portion for connecting said blades together and thereby retaining them against radial outward movement through said slots.

13. In a device of the class described, a hub, a hollow cap surrounding and enclosing said hub, fan blades extending through said cap to the space therewithin and arms on said hub for connecting the inner ends of said blades together to retain them against outward movement relative to said cap upon rotation of the cap.

14. A flexible blade fan comprising a hub, a plurality of fan blades formed of material sufficiently flexible upon striking an object to bend and of themselves to re-assume their original position without permanent distortion and sufficiently rigid that during rotation they will maintain their pitch angle for the purpose of air delivery, said blades being secured flatwise to said hub, and a cap connected with said hub, said cap having slots to receive said blades at points spaced radially from said hub, said slots being arranged at the desired pitch angle relative to the axis of rotation of the cap.

15. A flexible blade fan comprising a hub, a plurality of fan blades radiating therefrom and being formed of material sufficiently flexible to permit bending thereof upon engaging and object during rotation of the fan, yet sufficiently rigid to maintain their pitch angle during rotation for effective air delivery, a cap surrounding said hub and having slots extending inwardly from the base thereof and arranged at an angle relative to the axis of the cap, a connector element on said hub within said cap, said blades being connected therewith and extending therefrom and through said slots and thereby maintained beyond the cap at the desired pitch angle.

16. A flexible blade fan comprising a hub, a plurality of blades radiating therefrom and being formed of material sufficiently flexible to permit bending thereof upon engaging an object during rotation of the fan, yet sufficiently rigid to maintain their pitch angle during rotation for effective air delivery, a hollow cap secured to and surrounding said hub and having slots extending inwardly from the base thereof and arranged at an angle relative to the axis of the cap, a connector element surrounding said hub and concealed within said cap, said blades being secured to said connector element and the outer ends thereof extending through said slots.

17. In an impeller, blades formed of flexible material of generally uniform thickness and similar in size and shape, a forwardly convexed dome coaxial with said blades and having counterpart slots extending forwardly into it from the rear end of the dome, said slots spiralling in the same direction rotationally of said dome and being equal in number to said blades and each blade having a similar portion thereof extending through said slots, a hub member coaxial with said dome and means associated with said hub member for anchoring said blades thereto.

18. An impeller including in rigid assembly, a plurality of flexible, similarly sized and shaped and uniformly spaced blades and a central blade connecting element, said blades radiating therefrom, means for concaving each blade forwardly about an axis approximately radially of the axis of said blade connecting element, said means comprising a dome member coaxial with said blade connecting element and provided with curved slots through which the blades respectively extend, each of said slots spiraling in the same direction rotationally of the dome member, said blade connecting element being housed by said dome and having rigid connection with said dome, and means for connecting the portions of said blades which extend inwardly through said slots to said connecting element.

19. In a flexible blade impeller, a forwardly convexed dome having counterpart and equally spaced slots extending spirally into it from its rear end, blades extending outwardly through said slots, a central blade carrying member connected with said blades, said blades being of the same number as said slots, said blade carrying member being coaxial with said dome and insertible therein and having circumferentially spaced parts respectively fastened to said blades, each of said parts of the blade carrier member sloping spirally at a pitch corresponding to that of one of the slots whereby all of said blades are adapted to be slid simultaneously edgewise into said slots by rotating the blade carrying member with respect to the dome.

EUGENE NEWNHAM.